Figure 1:
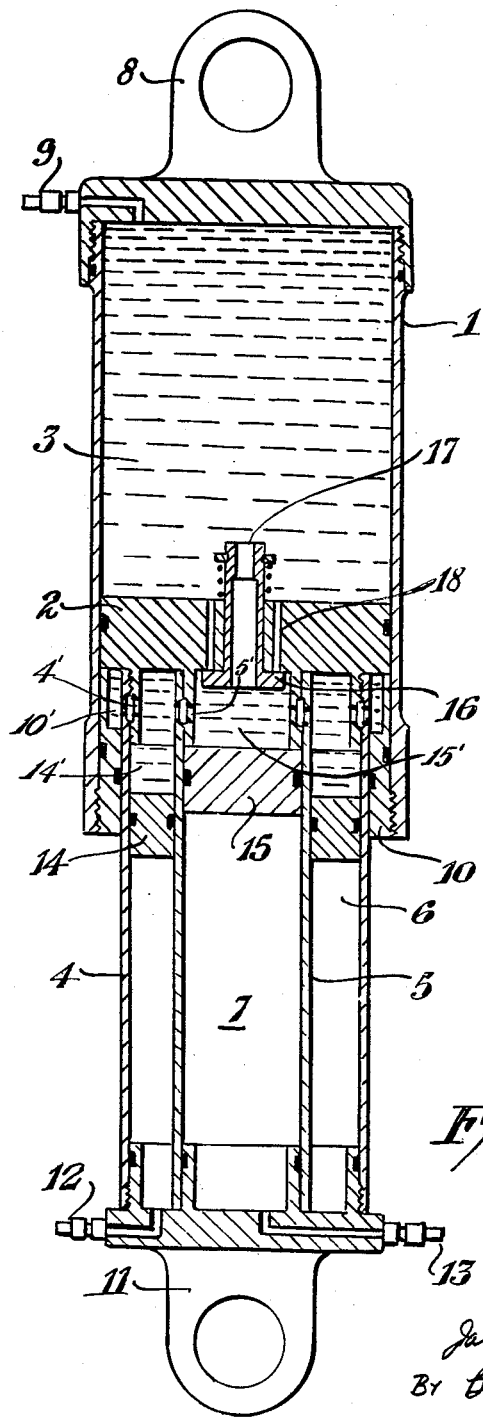

March 26, 1963

J. PERDUE 3,083,000

SHOCK ABSORBERS

Filed Aug. 15, 1960

2 Sheets-Sheet 1

Inventor:
Jack Perdue
By Baldwin & Wight
Attorneys

United States Patent Office 3,083,000
Patented Mar. 26, 1963

3,083,000
SHOCK ABSORBERS
Jack Perdue, Great Sankey, Warrington, England, assignor to Electro-Hydraulics Limited, Lancashire, England, a company of the United Kingdom
Filed Aug. 15, 1960, Ser. No. 49,512
Claims priority, application Great Britain Aug. 25, 1959
4 Claims. (Cl. 267—64)

This invention relates to shock absorbers and concerns more particularly shock absorbers of the type comprising two telescopic tubes in which fluid is contained in a deformable chamber permanently in communication with a second chamber through an orifice or orifices which may be valved, the whole shock absorber being in the form of two telescopic tubes. In such a type of shock absorber the space in the second chamber is spring controlled in such a way that, if the first chamber is deformed so as to force fluid through the orifices into the second chamber, the spring is strained, and will, on the removal of the deforming force or part thereof, drive the fluid or part of it back into the first chamber. The spring may be a deformable solid or a compressible liquid spring.

This invention is concerned with providing a shock absorber of the type described which is particularly suitable for use in aircraft undercarriage equipment. In this connection it is to be appreciated that when brakes are suddenly applied during taxying to the main wheels of a tricycle undercarriage, the aircraft tends to pitch forward onto the nose wheel. The pitching inertia of the aircraft applies slow closure to the nose wheel shock absorber, and the kinetic energy of the aircraft, due to the pitching, must be absorbed in the nose wheel tire and the nose wheel shock absorber. As the movement is slow, the damping effect, due to the orifices in the shock absorber, is small, and this kinetic energy is, therefore, normally absorbed only by the tire and the spring in the shock absorber, e.g. due to the compression of a volume of air. As the energy that can be absorbed in this way is less than that which would be absorbed by the damping orifices and air compression in normal closure, it frequently happens that either the spring in the shock absorber is compressed to give an excessive reaction, or more commonly that the shock absorber abutment faces close, so that it forms a rigid strut with consequent undesirable results.

In a known arrangement of a shock absorber of the type described and as set out in the specification of our prior Patent No. 2,564,790 there is provided a third chamber within one of the two tubes which chamber is spring controlled and is in valved communication with the deformable or first chamber, the arrangement being such that in the event of fluid pressure in the deformable chamber rising to a predetermined level, open communication between the deformable and third chambers is automatically effected.

A relief valve is provided between the deformable or first chamber and the third chamber, the setting of the relief valve and the pressure in the third chamber being such that when once a predetermined pressure has been reached in the first chamber, a relatively large amount of fluid may pass from the first chamber to the third chamber without any considerable increase in the pressure in the first chamber.

It will however be appreciated that this construction may have certain disadvantages. Firstly the length of the main cylinder must provide for twice the stroke of the sliding parts plus the air space which may make the cylinder length excessive for certain installations and secondly there is no positive separation between the oil and air in the upper chamber.

It is the object of this invention to provide a shock absorber having the required characteristics and which will overcome these disadvantages, while also providing such a shock absorber which may be used with advantage in the design of certain types of main undercarriages.

According to the present invention in a shock absorber of the type described the spring control of the second chamber is provided by spring loaded pistons in the third and fourth chambers, concentrically located within one of the tubes and separated from each other by a third tube and from the second chamber by their respective pistons so that, on closure of the absorber, damping is effected between the first and second chambers and the springs are constrained consecutively.

Figure 2:
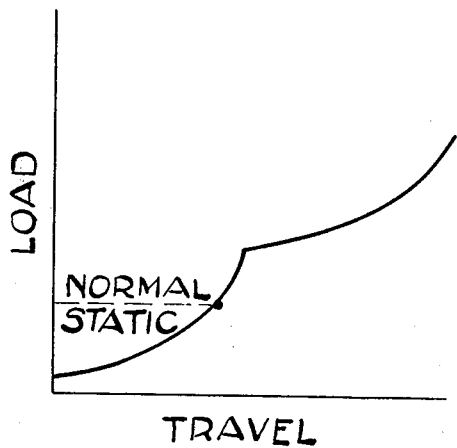
Figure 3:
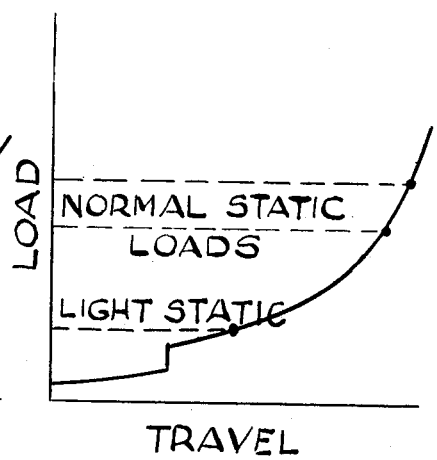
Figure 4:
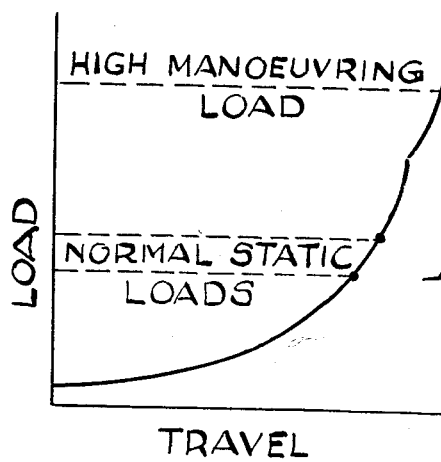

One form of construction according to this invention and as applied to an eleo pneumatic shock absorber is illustrated in the accompanying drawing in which FIGURE 1 shows the shock absorber in section;

FIGURES 2–4 inclusive show air pressure curves during operation of the shock absorber.

Referring to FIGURE 1, the shock absorber comprises a main cylinder 1 and a bored piston 2 slidable therein and which together form a liquid e.g. oil chamber 3, which constitutes the first chamber mentioned above. Attached to the sliding piston 2 is a hollow piston rod 4 and inner tube 5 which form an annular chamber 6 and a chamber 7, i.e. the third and fourth chambers respectively, both of which contain or mainly contain a fluid e.g. air or gas, under pressure. The main cylinder is formed at one end to retain the fluid tight attachment 8 and filling connection 9. The lower end of the cylinder is closed by a plug 10 which may be provided with seals, if the annular space between cylinder 1 and piston rod 4 forming the second chamber 10' is used as a liquid space. The hollow piston rod 4 is formed at the lower end to retain a fluid tight attachment 11 and inflation valves 12 and 13.

Separator pistons 14 and 15 are slidably mounted in the chambers 6 and 7 respectively. A spring loaded valve 16 having an orifice 17 is mounted in the sliding piston 2, which is orificed as at 18, which orifices are closed by the valve 16, when in its closed position.

The chamber 3 and the spaces 14' and 15' between the sliding piston 2 and the respective separator pistons 14 and 15, are filled with liquid through the connection 9. The chamber 10' and spaces 14' and 15' are in communication through openings 4' and 5' through the hollow rod 4 and tube 5. Fluid under pressure is admitted to chambers 6 and 7 through inflation valves 12 and 13. The inflated pressure in chamber 6 may be higher than in chamber 7 or this procedure may be reversed. For the purpose of this description it is assumed that chamber 7 has the higher pressure.

On normal closure of the shock absorber, liquid damping is effected by the orifices 17 and 18 and initially the fluid in chamber 6 is compressed, due to the liquid pressure on the separator piston 14. After a predetermined point in the travel is reached, the said pressure acts through the separator piston 15 to compress the air in the air chamber 7 and this process continues for the remainder of the travel of the shock absorber.

Although the valve 16 is shown as being springloaded, such loading is not essential.

A typical air pressure curve for this type of shock absorber is shown in FIGURE 2.

A further advantage of this type of shock absorber is that one of the air springs may be allowed to "bottom" before the other starts to move.

It will be appreciated that by using such an arrangement, it is possible to provide an air spring whose ratio of initial to final load may be very high, which is of advantage in the design of certain types of aircraft main and nose undercarriage shock absorbers.

One example is shown in FIGURE 3 where the spring ensures reasonable closures at light loads as well as the desired closure at normal weights.

A second example is shown in FIGURE 4 where the spring provides for excessive loads at the end of travel as may occur at a main undercarriage when manoeuvring an aircraft with narrow track.

What I claim is:

1. A shock absorber comprising a cylinder having a sealing head at one end, a piston slidable in the other end of said cylinder and forming therewith a liquid chamber, a pair of cylindrical members fixed at one end to said piston and projecting from the other end of said cylinder, a head engaging and forming a closure for the other ends of said cylindrical members, a slidable seal in the inner concentric member, and an annular slidable seal between said cylindrical members, the ends of said cylindrical members remote from said cylinder forming compression chambers, there being spaces between said slidable seals and said piston communicating with said cylinder to receive liquid displaced therefrom whereby said seals are actuated by such liquid to be moved into said compression chambers.

2. A shock absorber as claimed in claim 1 provided with openings of limited size to provide a damping action of liquid flowing from said cylinder into said spaces.

3. A shock absorber as claimed in claim 1 wherein said compression chambers are air chambers, and separate inflating valves for said chambers to provide for inflation thereof at different pressures whereby displacement of liquid from said cylinder into said spaces actuates first one and then the other of said slidable seals.

4. A shock absorber as claimed in claim 1 in which the other end of said cylinder is provided with a bearing in which the outer of said cylindrical members in slidable, the latter cylindrical member forming with said bearing and with said piston a liquid-receiving chamber, said outer cylindrical member having orifices communicating between said liquid-receiving chamber and the adjacent space between said cylindrical members.

References Cited in the file of this patent

UNITED STATES PATENTS

| | | |
|---|---|---|
| 2,883,181 | Hogan | Apr. 21, 1959 |
| 2,959,410 | Fullam et al. | Nov. 8, 1960 |